Patented Oct. 10, 1950

2,525,611

UNITED STATES PATENT OFFICE 2,525,611

METALLIZABLE DYES FROM TRIMETHYL-ACETOACETONITRILE

Robert S. Long, Plainfield, N. J., assignor to American Cyanamid Company, New York, N. Y., a corporation of Maine No Drawing. Application October 9, 1948, Serial No. 53,756

6 Claims. (Cl. 260—193)

This invention relates to a new class of metallizable azo dyestuffs of the general formula

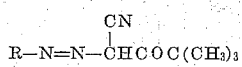

in which R is the radical of a diazotized amine containing a metallizable group ortho to the azo linkage.

Aliphatic acetoacetonitriles are difficult to prepare, particularly the low molecular weight compounds of this type. Not only are the compounds difficult to prepare, but many of them are unstable. For example, acetoacetonitrile itself is so unstable that it has not been isolated in the pure state and is only known in the form of derivatives. Trimethylacetoacetonitrile which is the coupling component used in the preparation of dyestuffs according to the present invention appears to be quite exceptional in its properties. In spite of the fact that most aliphatic acetoacetonitriles are extremely unstable and difficult to prepare, trimethylacetoacetonitrile can be prepared by a fairly simple synthesis and has sufficient stability so that it can be used in a coupling reaction. Once coupled with the diazotized amine having metallizable groups in ortho position, azo dyestuffs result which are extremely stable and are capable of producing metallized dyes of excellent fastness and other properties. It is not fully known why the dyestuffs produced from trimethylacetoacetonitrile show such extraordinary stability when the aliphatic acetoacetonitriles particularly the lower members of this series are so unstable and the present invention is not intended to be limited to any theory of why compounds belonging to such an unstable group are capable of forming such stable dyestuffs.

It is an advantage of the present invention that the metallizable dyestuffs of the present invention can be metallized by the ordinary methods of metallization and dyed by ordinary dyeing procedures to produce strong, fast, and level shades.

The azo dyestuffs of the present invention may be prepared by conventional processes of diazotization and coupling, and it is an advantage that no new techniques are required. In general, any diazo or tetrazo compound may be used so long as it contains at least one hydroxyl or carboxyl group ortho to the diazo group. Typical amines which may be diazotized and used in preparing the dyestuffs of the present invention are the following: 2-amino-4-nitrophenol, 2-amino-5-nitrophenol, 2-amino-4-chlorophenol, 3-amino-4-hydroxybenzenesulfonic acid, 2-methyl-4-amino-5-hydroxybenzenesulfonic acid, 2-hydroxy-3-amino-5-nitrobenzenesulfonic acid, 2-hydroxy-3-amino-5-chlorobenzene-sulfonic acid, 3-amino-4-hydroxy-5-nitrobenzenesulfonic acid, anthranilic acid, 1-amino-2-hydroxynaphthalene-4-sulfonic acid, 1-amino-2-hydroxy-6-nitronaphthalene-4-sulfonic acid, and 2-amino-3-hydroxybenzoic acid.

The invention will be described in greater detail in the following examples which are typical illustrations. Parts are by weight.

Example 1

A mixture of 26 parts ethyl trimethylacetate, 10.3 parts acetonitrile, and 10.8 parts of sodium methylate is maintained at a temperature of 102°–105° C. and stirred for four and one-half hours. The reaction mixture is then added to 100 parts ice water, clarified with activated charcoal, and the product precipitated from solution by the careful addition of 20% acetic acid. Trimethylacetoacetonitrile melts at 68° C.

Example 2

A mixture of 5.5 parts of trimethylacetoacetonitrile, 11.5 parts of 5 N sodium hydroxide solution, and 40 parts of water is cooled to 5°–10° and treated with stirring with a solution of 40 parts of water containing 9.5 parts of 5 N sodium hydroxide and 11.2 parts of the diazo compound of 1-amino-2-naphthol-4-sulfonic acid. When coupling is complete, the reaction mixture is diluted with 100 parts of water and strongly acidified with hydrochloric acid. The thick orange precipitate is filtered, giving a quantitative yield of product, of the formula:

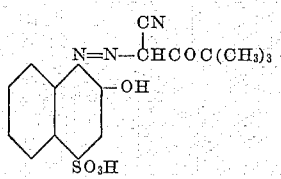

It dyes wool a bright bluish red.

Example 3

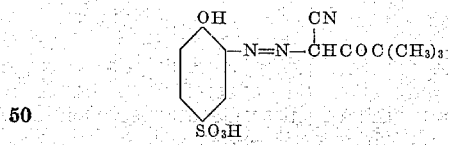

A mixture of 1.9 parts of o-aminophenol-p-sulfonic acid, 6.5 parts of 5 N hydrochloric acid, and 8 parts of water is cooled to 5° C. and diazotized with N sodium nitrite solution. Diazotization is completed by allowing the temperature to rise to 12°. To the diazo mixture is then added a mixture of 1.2 parts of trimethylacetoacetonitrile, 2.4 parts of 5 N sodium hydroxide, and 15 parts of water. Coupling is completed by adding sodium carbonate until the mixture is alkaline to phenolphthalein. The product is isolated by the addition of 24 parts of sodium chloride and acidifying with 5 N hydrochloric acid. The greenish precipitate resulting is filtered and dried. It dyes wool a rust color.

*Example 4*

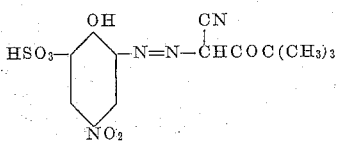

A mixture of 2.4 parts of 2-amino-4-nitrophenol-6-sulfonic acid, 8.6 parts of 5 N hydrochloric acid, and 15 parts of water is diazotized with N sodium nitrite solution. To the resulting solution is added a mixture of 1.4 parts of trimethylacetoacetonitrile, 2.4 parts of 5 N sodium hydroxide solution, and 15 parts of water. The product is isolated by salting out with 10% sodium chloride solution from the still alkaline reaction mixture. The red precipitate is filtered and dried. It dyes wool a greenish-yellow.

*Example 5*

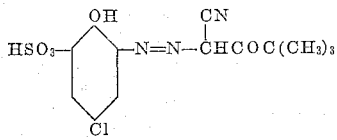

A solution of 2.3 parts of 2-amino-4-chlorophenol-6-sulfonic acid in 4.8 parts of 5 N sodium hydroxide and 30 parts of water is precipitated by the addition of 17 parts of 5 N hydrochloric acid and then diazotized with N sodium nitrite. The resulting diazo is added slowly to a solution of 1.4 parts of trimethylacetoacetonitrile in 25 parts of water containing 2.4 parts of 5 N sodium hydroxide and 8.5 parts of sodium carbonate. The dark red precipitate which forms is dissolved in caustic, and reprecipitated as a yellow solid by acidification. It dyes wool a brick-red color.

*Example 6*

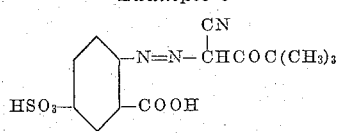

A mixture of 2.75 parts of 5-sulfoanthranilic acid dihydrate, 15 parts of water, and 8.6 parts of 5 N hydrochloric acid is diazotized with N sodium nitrite solution. To the resulting diazo slurry is added a mixture of 1.4 parts of trimethylacetoacetonitrile, 15 parts of water, and 2.4 parts of 5 N sodium hydroxide, keeping the temperature around 10°. When coupling is complete, the product is dissolved in caustic and isolated by the addition of 20% salt solution and 5 N hydrochloric acid. The dyestuff forms a yellow precipitate which is filtered and dried at 60°. It dyes wool a bright greenish-yellow.

I claim:
1. An azo dye of the formula

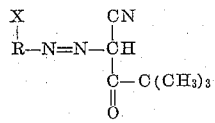

wherein

is the radical of a diazotized amine selected from the group consisting of amines of the benzene series and amines of the naphthalene series and X is a substituent selected from the groups consisting of hydroxyl and carboxyl, the position of said substituent being ortho to the —N=N— group of said formula.

2. An azo dyestuff of the formula

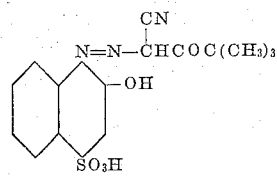

3. An azo dyestuff of the formula

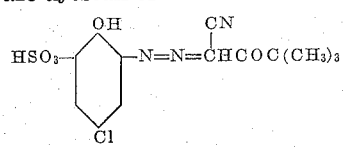

4. An azo dyestuff of the formula

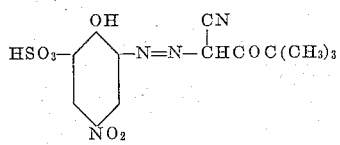

5. An azo dyestuff of the formula

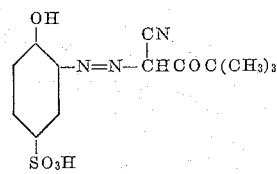

6. An azo dyestuff of the formula

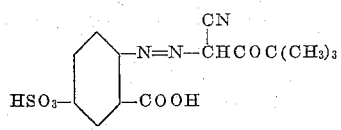

ROBERT S. LONG.

REFERENCES CITED

The following references are of record in the file of this patent:

UNITED STATES PATENTS

| Number | Name | Date |
|---|---|---|
| 2,211,339 | McNally et al. | Aug. 13, 1940 |
| 2,366,633 | Long | Jan. 2, 1945 |
| 2,392,167 | Long | Jan. 1, 1946 |

OTHER REFERENCES

Widman et al.: Ber., v. 44 (1911), pp. 2065–2071, 7 pages.